P. PANOULIAS.
COATING AND STROKING OR DECORATING DEVICE.
APPLICATION FILED JUNE 30, 1911.
1,148,793.
Patented Aug. 3, 1915.
5 SHEETS—SHEET 4.
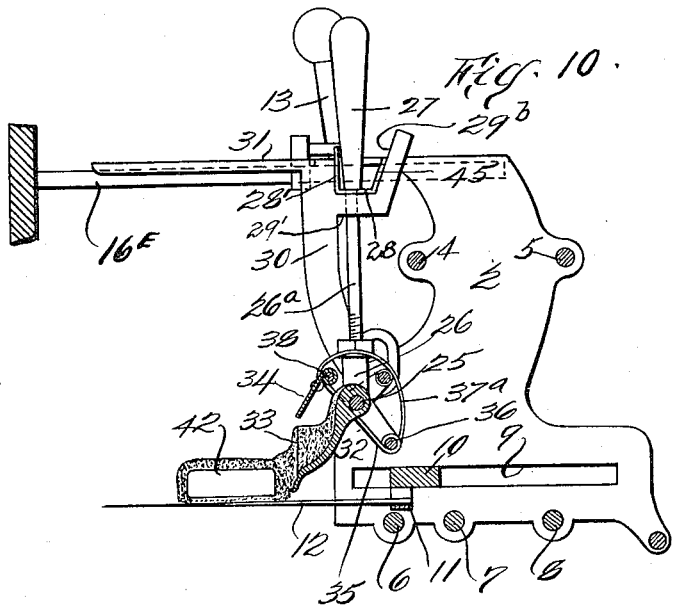
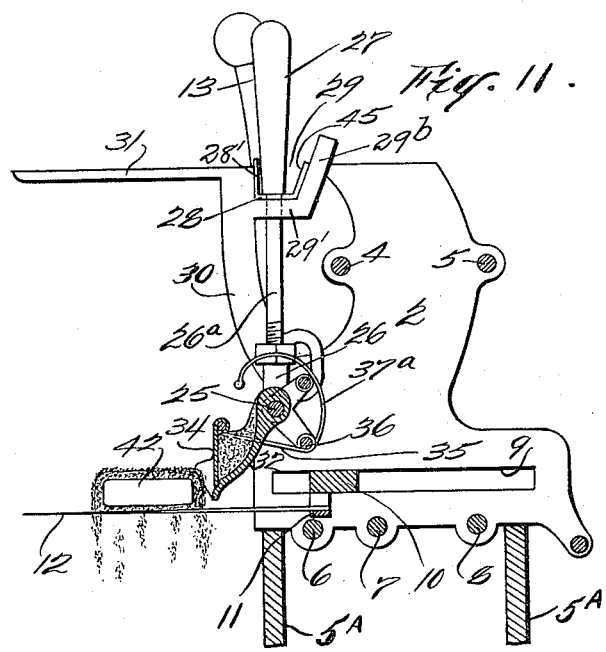

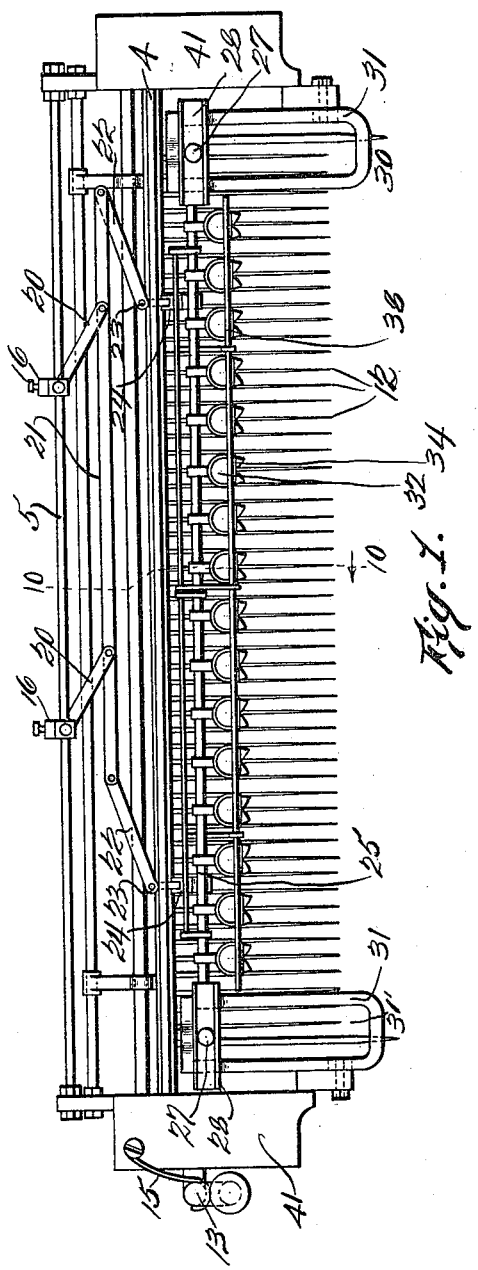
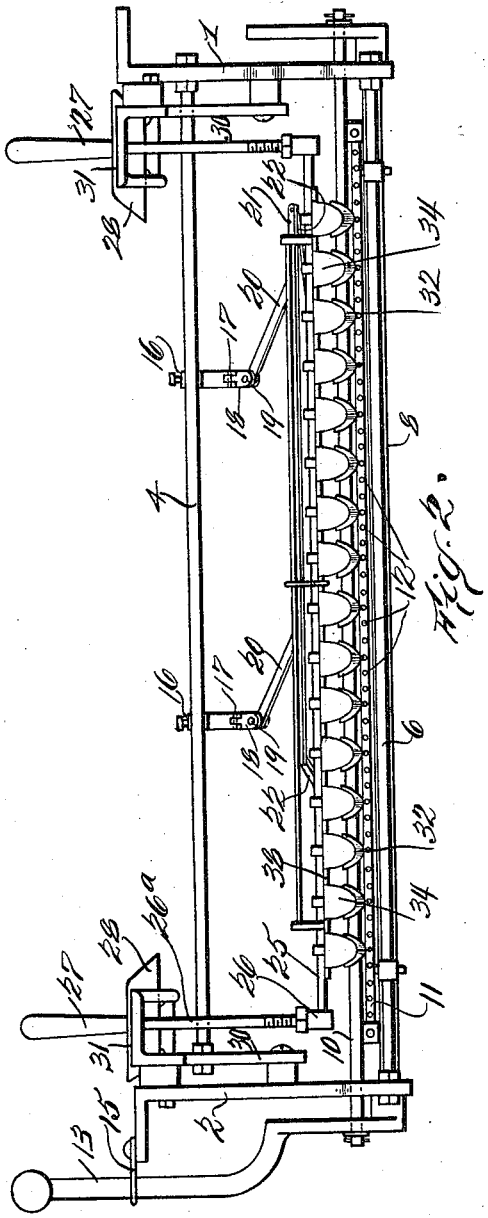

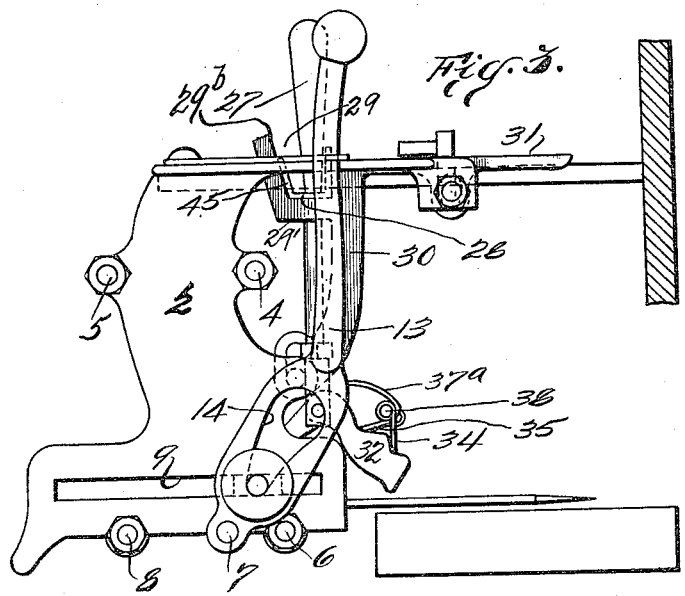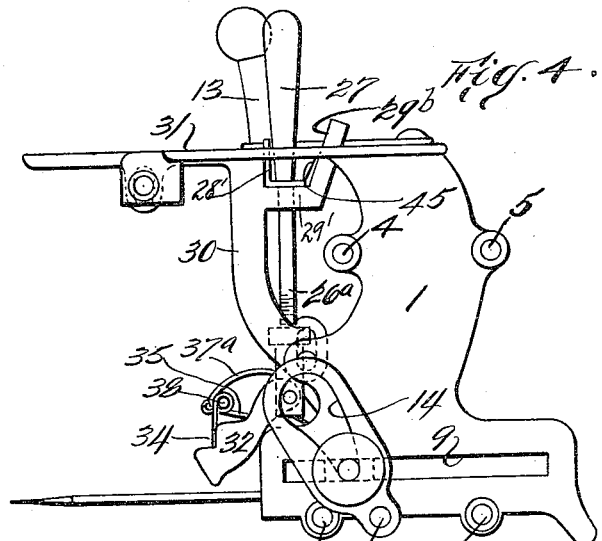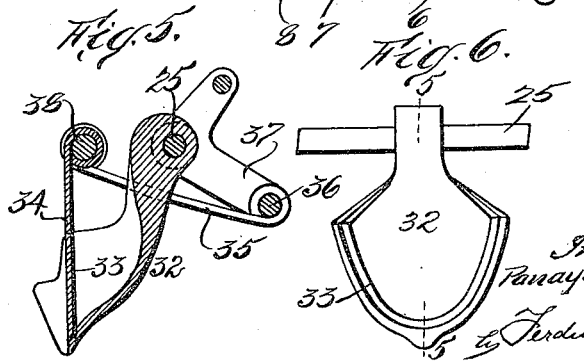

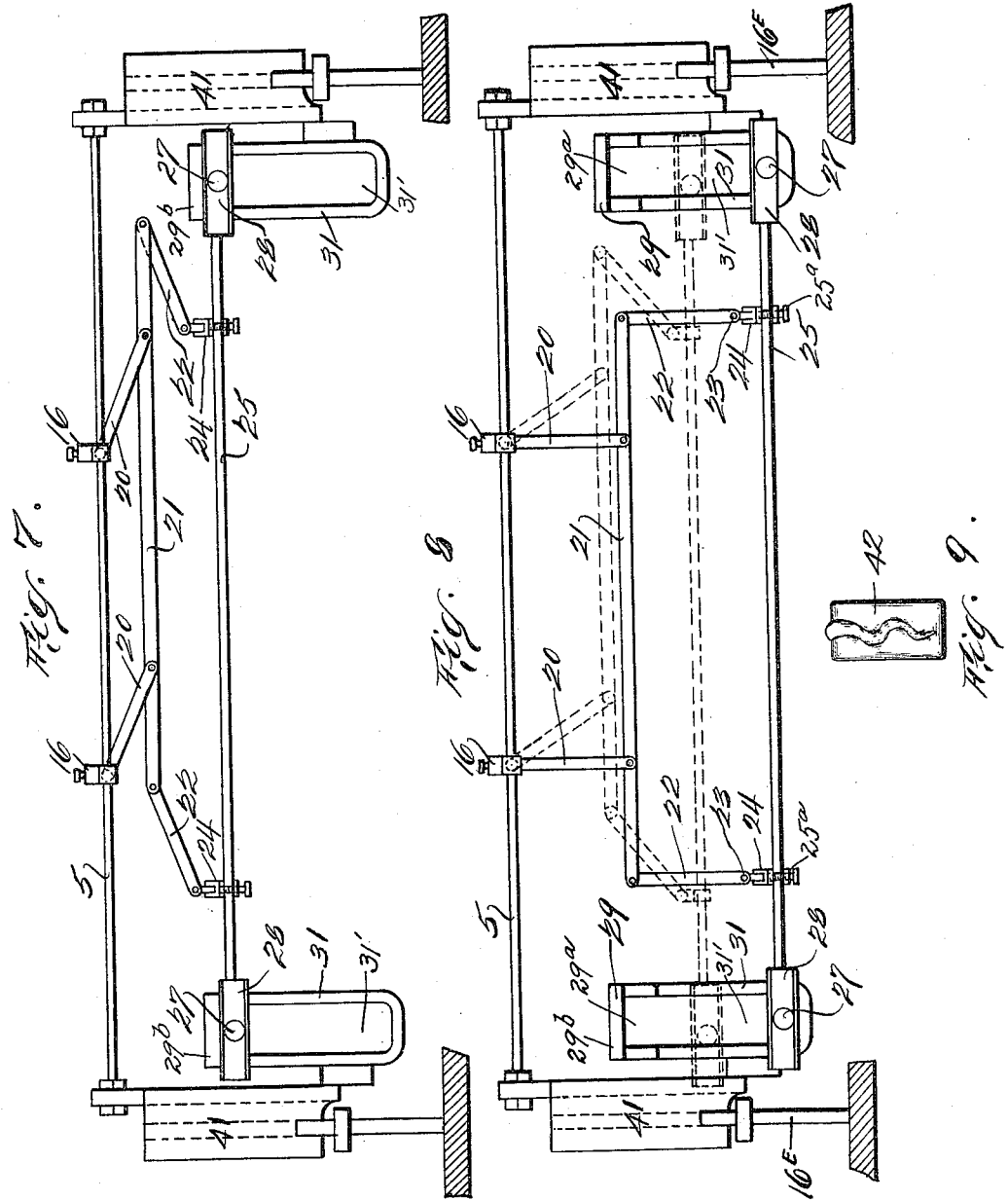

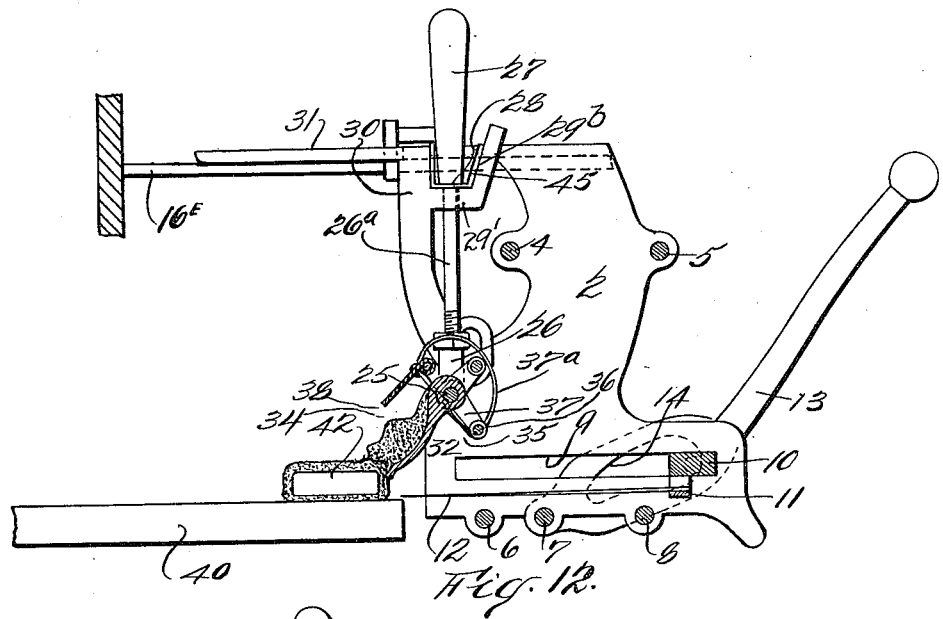
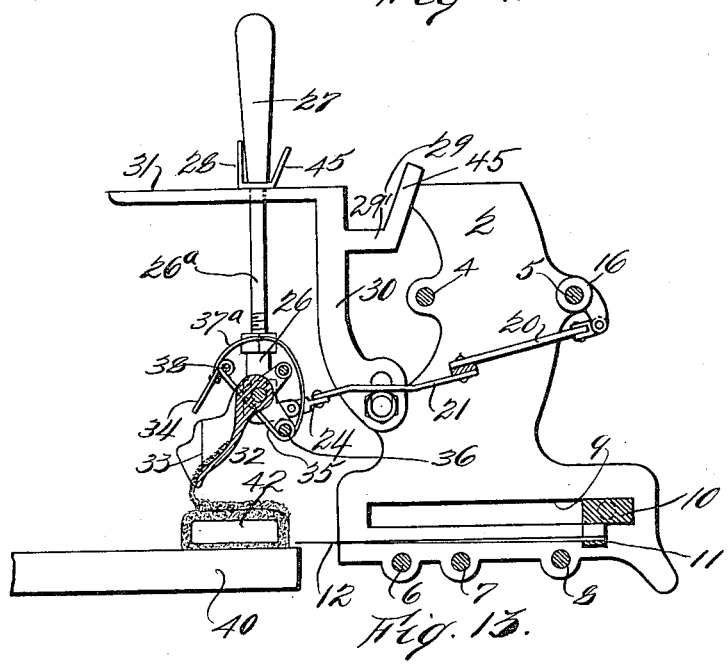

UNITED STATES PATENT OFFICE.

PANAYIOTIS PANOULIAS, OF NEW YORK, N. Y.

COATING AND STROKING OR DECORATING DEVICE.

1,148,793. Specification of Letters Patent. Patented Aug. 3, 1915.

Application filed June 30, 1911. Serial No. 636,148.

*To all whom it may concern:*

Be it known that I, PANAYIOTIS PANOU-LIAS, a subject of the King of Greece, residing at New York city, in the county of New York and State of New York, have invented certain new and useful Improvements in Coating and Stroking or Decorating Devices, of which the following is a clear, full, and exact description.

The object of this invention is to provide a mechanism for coating and stroking or decorating cores or other centers, confections, cakes and like articles and substances, whereby a stroke or decoration may be made upon the same to produce an ornamentation similar to that placed upon cores by hand dippers.

It will be understood that there is a prejudice against machine dipped or coated cores, not because they are machine dipped, but because confectioners have always coated their poorer grade of goods on machines and used a poor quality of coating material, whereas their higher grade of goods were coated by hand, and a good quality of coating material was used. To make the machine made goods salable for high prices, it is necessary that the appearance of the goods indicates to the purchaser that there is a coating of proper quality surrounding the core. The public has long been used to a certain thickness and quality from hand dippers and has learned to consider the stroke or mark which emerges from a portion of the goods itself and is then decoratively laid on top of the goods as a string, as an indication that the proper quality and quantity of chocolate has been used. One great disadvantage of hand dipping is that the perspiration from the hand destroys the gloss on the goods and makes them unsanitary to a certain extent.

It is the purpose of this invention to produce an ornamentation or decoration similar to that placed upon cores by hand dippers, by a sanitary method which also provides a guarantee that the coating is of the right quality and consistency so that the public will accept the same at its true value. It will be hereinafter noted that for such purpose I not only take part of the coating of the goods and string it over the top of the core, but that I supply additional coating to make a more pronounced and longer decorative effect. The additional coating however in the specific embodiment of my invention shown in the drawings, is preferably taken from the same bath that the cores are dipped in or with which they are coated, and hence the additional coating is a guarantee not only that the string or stroke or decoration is of the right quality, but that the entire coating is also of such quality.

In carrying out my invention in the specific embodiment, I provide a long dipping frame having a pin bar acting as a support for the candy cores during their stroking or decoration, and a stroking or decorating means carried by the frame which preferably consists of a series of spoons or mechanical thumbs fitting close to the pin bars. In front of each spoon or mechanical thumb a candy core is placed. I prefer to provide plates on the spoons or mechanical thumbs to retain coating material which will be hereinafter described. The operator takes the long frame in his hand and plunges it substantially in the arc of a circle into a bath of coating material of proper consistency until the same covers the cores. Skill will enable the operator to perform this dipping or coating function without dislodging the cores, except perhaps to throw them against the spoons or mechanical thumbs. He then lifts the frame from the bath, places it on a rack and shakes it more or less violently which causes the plates to come down and cut off the egress of coating material from the spoons or mechanical thumbs. The shaking also smooths out any roughness in the coating and shakes off any unnecessary surplus from the wires, cores and parts of the frame. The operator then raises the plates and moves the frame on to a plaque, table or ledge, which may be the board shown in the drawings or any other well known receiving means for cores, and then withdraws the needles pulling the cores against the spoons or mechanical thumbs so that they are well in contact with the coating held therein, and as the needles recede from beneath the cores they drop on to the plaque, table or ledge immediately below them. The operator then in the specific embodiment of my invention shown in the drawings, grasps the frame which carries the series of spoons or mechanical thumbs, raises it and by means of the initial contact of the spoons or mechanical thumbs draws a string from the coated core and then moves the frame, thereby moving the spoons or mechanical thumbs with the string in zig-zag or other relation across the candy to provide any desirable design. Proper guides are provided to seat the spoons or mechanical thumbs close to the support for dipping or coating, to limit the extent of vertical motion above the cores and relative to them, and to limit transverse motion. All these guides may be adjustable so that one frame may be adapted to any style of core. A single continuous contacting means may be provided instead of the plurality of spoons or mechanical thumbs shown in the drawings.

It will be understood that the mere producing of a stroke across the core such as shown in Letters Patent #633,359, granted to me on December 4th, 1900, or as shown in Letters Patent #707,864, granted to me on August 25th, 1902, is not broadly the purpose of this invention, this invention being a subsidiary invention to those of said patents, and its purpose being to provide improved means for producing strokes or decorations. It will be understood that the type of dipping frame with pin bars is substantially that shown in Letters Patent #588,349, granted to me on August 17th, 1897 as to the pin bars, and that many of the features of the frame are similar to the frame shown in Letters Patent #809,737, granted to me on January 9th, 1906.

The main purpose of this invention is to provide for any type of dipping or coating frame a mechanism having contacting means which may be universally or otherwise mounted and be adapted for operation relatively to the cores and movable in any direction and controlled so that the ornamentation of the cores may be varied and goods produced which are more marketable than those heretofore stroked by machines.

In the accompanying drawings I have shown a specific embodiment of my invention for use in a frame which may be manually dipped in coating material. It will be understood however that the invention is capable of application in automatic machines.

In the accompanying drawings: Figure 1 is a plan view of my specific form of dipping frame. Fig. 2 is a front elevation thereof. Fig. 3 is an end elevation drawn to an enlarged scale. Fig. 4 is an end elevation of the end opposite Fig. 3. Fig. 5 is an enlarged detail of the spoons or mechanical thumbs in section taken on line 5—5 Fig. 6. Fig. 6 is a front elevation of one of the stroking or decorating spoons or mechanical thumbs. Fig. 7 is a plan view of part of the dipping frame illustrating the universal connection between the bar which carries the stroking or decorating spoons or mechanical thumbs and the frame. Fig. 8 is a view similar to Fig. 7 showing the bar which carries the stroking or decorating spoons or mechanical thumbs in its extreme extending position. Fig. 9 is a view of one type of stroke or decoration which may be made on the device. Fig. 10 is a sectional view of line 10—10, Fig. 1, showing a core in place immediately after dipping or coating. Fig. 11 is a view similar to Fig. 10 showing the condition of the spoon or mechanical thumb and core after shaking. Fig. 12 is a view similar to Fig. 11 showing the position of the core and the spoon or mechanical thumb after the core is delivered from the coating support or stroking support. Fig. 13 is a view similar to Fig. 12 showing the frame producing the stroke or decoration on top of the core.

As shown in the drawings: my improved device consists of end brackets 1 and 2 connected by longitudinal rods 4, 5, 6, 7 and 8. Each bracket is provided with a slide 9, in which a sliding bar 10 carrying the pin bar 11, may be reciprocated. The pin bar 11, carries a number of outstanding pins 12. A lever 13 mounted on the rod 7 and provided with a cam slot 14 may be rocked to and fro to move the pin bars from the position shown in Figs. 1 and 10, into the position shown in Figs. 12 and 13. A spring catch 15 serves to hold the lever 13 which holds the pin bar in the position shown in Figs. 1 and 2 for the dipping or coating operation. Connected to the longitudinal rod 5 are clamps or hinges 16. On the horizontal pivot 17 is secured a lug 18 having a substantially vertical pivot point 19. To each of the above points 19 there is connected a link 20 in turn pivoted on a longitudinal connecting rod 21, having pivoted end links 22, the other ends of which are connected by substantially vertical pivots 23 with lugs 24 adjustably secured as by clamps 25$^a$ to a rod 25 which is part of the supplemental or stroking frame. The rod 25 terminates in threaded lugs 26, into which are threaded vertical rods 26$^a$ of the manual operating means 27. The manual operating means carries the handle 27 and, below the latter, an elongated plate 28 carrying longitudinal, upturned flanges 28′ and 45. Adjustably secured to each vertical end-bracket 2 in any suitable manner is an upright 30 carrying, toward its top, an outward-projecting, horizontal guide-flange 31 having a slot 31′ therein extending from a point near the free, front end-wall of said flange and through the rear end-wall thereof. Each of said uprights 30 is also provided, near the top thereof, and adjacent one end of each of said guide-flanges 31 and in a horizontal plane therebeneath, with an inward-projecting, horizontal flange 29′, having an opening 29$^a$ therethrough communicating with the slot 31′. The flange 29′ terminates in an upturned extension 29$^b$, which, preferably and advantageously, projects above the flange 31. There is thus formed a trough 29, in which seats said plate 28, the ends whereof rest on the ends of said flange 29', and the flanges 28' and 45 whereof rest against the sides of said trough. It will be noted that, during the stroking operation, the handles 27 are pulled upward, thus lifting the flanged plate 28 out of the trough 29, whereupon said plate is moved over onto the slotted flange 31, the rods 26ª projecting through the slot 31' in said flange 31 and the said plate 28 then rests and slides on the flange 31. The plate 28 may then be slid in any direction, the movements thereof being limited by contact of the rods 26ª with the walls of the slot 31'. It will be noted, by the construction described, that a limited sidewise movement of the rods 26ª is permitted, as well as a forward and backward movement.

On the longitudinal rod 25 there are carried a number of spoons or mechanical thumbs 32 having a shoulder 33 on their sides as shown in Fig. 6 so that a plate 34 fits into the spoon and against the shoulder to hold coating material therein at such times as it is desired. A link 35 secured to a reinforcing rod 36 of a bracket 37, which is mounted on the rod 25, serves as a guide for the rod 38 which carries the plates 34. Secured to the rod 36, (see Fig. 11) is a spring 37ª with a turned knob at its end, so that if the operator lifts the plate it will be held as shown in Fig. 10 behind the knob of the spring 37ª and there received. The reference 40, Figs. 12 and 13, represents the support for the core during the stroking operation which is generally a plaque, table or ledge and is frequently part of an endless carrier. The side handles 41 of the main frame serve as gripping handles to the operator in dipping the frame.

42 represents the core in the process of coating and stroking.

In operation, the device or frame is placed in the position shown in Fig. 10, the plates being lifted to leave the spoons or mechanical thumbs 32, and then immersed in the bath until the cores are coated and the spoons or mechanical thumbs filled with coating material. It is then placed on a rack 5ª and shaken as shown in Fig. 11, which shakes the plates 34, free of the knob at the end of the spring 37ª which causes them to fall and cut off the egress of chocolate from the spoons or mechanical thumbs during the continued shaking. The operator then raises the plates engaging them with the knobs at the end of the spring 37ª so as to leave the spoons or mechanical thumbs free to discharge the coating material there collected. He then places the frame on the rack 16°, as shown in Figs. 8, 10 and 12 and then grasps the lever 13, and throws it to the position shown in Fig. 12 having first placed his frame in proximity to the plaque, table or ledge 40. This causes the coated cores to be discharged thereon. He then grasps the manual controlling handles 27 lifts them up out of the trough until they are on a plane with the projecting guide flange 31 and he then slides the flanged plate 28 of the handle out along the guide flange 31 moving it sidewise in a curve or in any way he desires to effect a peculiar stroking of the coated cores as shown in Fig. 13. It will be noted that Fig. 12 shows the plate in position after a delivery to the plaque, table or ledge. The operation can be carried out by lifting the plate from the position shown in Fig. 11, before dislodging the core on to the plaque, table or ledge. It is not in all instances necessary to use the plate. This depends a great deal upon the amount of shaking that is to be given to the core and the stroke or decoration desired. It will be noticed that the projection 28 of the handle resting on the guide enables the spoons or mechanical thumbs to be kept a certain definite distance above the cores and that any motion imparted to one handle or to one spoon or mechanical thumb is faithfully copied by every other spoon or mechanical thumb, inasmuch as all the spoons or mechanical thumbs being a part of the supplemental frame are connected by the universal rectangular mechanism with the main frame. This gives a complete and perfect guide and causes all cores stroked at one operation to be the same. At the end of the stroke the handles may be swung forward to lift the spoons or mechanical thumbs farther from the coated core and break the stroke. For this purpose the rear wall of the plate 28 is formed as shown at 45 at an angle to lie against the flanged extension 29³.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense. It is furthermore desired to be understood that the language used in the following claims is intended to cover all the generic and specific features of the invention herein described, and all statements of the scope of the invention which as a matter of language might be said to fall therebetween.

I claim as my invention:

1. In a confectionery-making device, a frame, a horizontal, stationary shaft, a movable, horizontal shaft, and pivotally-jointed means connecting and adjustably secured to said shaft.

2. In a confectionery-making device, a frame, a horizontal, stationary shaft, a movable, horizontal shaft carrying spoons, and pivotally-jointed means connecting and adjustably secured to said shafts.

3. In a confectionery-making device, a frame, a stationary, horizontal shaft, a movable, horizontal shaft, vertical rods adjustably secured to said movable shaft, and pivotally-jointed means connecting and adjustably secured to said shafts.

4. In a confectionery-making device, a frame, a stationary, horizontal shaft, a movable, horizontal shaft, vertical rods having a screw-threaded connection with said movable shaft, and pivotally-jointed means connecting and adjustably secured to said shafts.

5. In a confectionery-making device, a stationary, horizontal shaft, a movable, horizontal shaft carrying threaded lugs, vertical rods threaded into said lugs, and pivotally-jointed means connecting and adjustably-secured to said shafts.

6. In a confectionery-making device, a frame carrying slotted guide-flanges, a movable, horizontal shaft, a stationary, horizontal shaft, vertical rods connected to said movable shaft and movable in the slots of said guide-flanges, and pivotally-jointed means connecting and adjustably secured to said shafts.

7. In a confectionery-making device, a frame carrying slotted guide-flanges, a movable, horizontal shaft, a stationary, horizontal shaft, vertical rods connected to said movable shaft and movable in the slots of said guide-flanges, plates carried by said rods and slidable on said guide-flanges, and pivotally-jointed means connecting and adjustably secured to said shafts.

8. In a confectionery-making device, a frame carrying slotted guide-flanges, a movable, horizontal shaft, vertical rods connected thereto and movable in the slots of said guide-flanges, a stationary, horizontal shaft, pivotally-jointed means connecting and adjustably secured to said shafts, flanged plates carried by said rods and slidable on said guide-flanges, and troughs carried by said frame and positioned adjacent one end of said slotted guide-flanges, into which troughs said flanged plates may slide, the flanges of said plates thereby engaging the walls of said trough.

9. In a confectionery-making device, a frame carrying slotted guide-flanges, a movable, horizontal shaft, vertical rods connected thereto and movable in the slots of said guide-flanges, a stationary horizontal shaft, pivotally-jointed means connecting and adjustably secured to said shafts, flanged plates carried by said rods and slidable on said guide-flanges, and troughs carried by said frame adjacent one end of said slotted guide-flanges, the bottoms of said troughs lying in a horizontal plane beneath said guide-flanges, said flanged plates being movable into said troughs, whereby the flanges of the former engage the walls of the latter.

Signed at the city of New York, in the county of New York and State of New York, on the 29th day of June, in the year one thousand nine hundred and eleven.

PANAYIOTIS PANOULIAS.

Witnesses:
HARRIET E. PELIKAN,
MARK ARACKMAN.

Copies of this patent may be obtained for five cents each, by addressing the "Commissioner of Patents, Washington, D. C."